3,012,355
FISHING PLUG RETRIEVER
Harry M. Cottrell, 1949 E. 64th St., Los Angeles, Calif.
Filed June 8, 1959, Ser. No. 818,592
1 Claim. (Cl. 43—17.2)

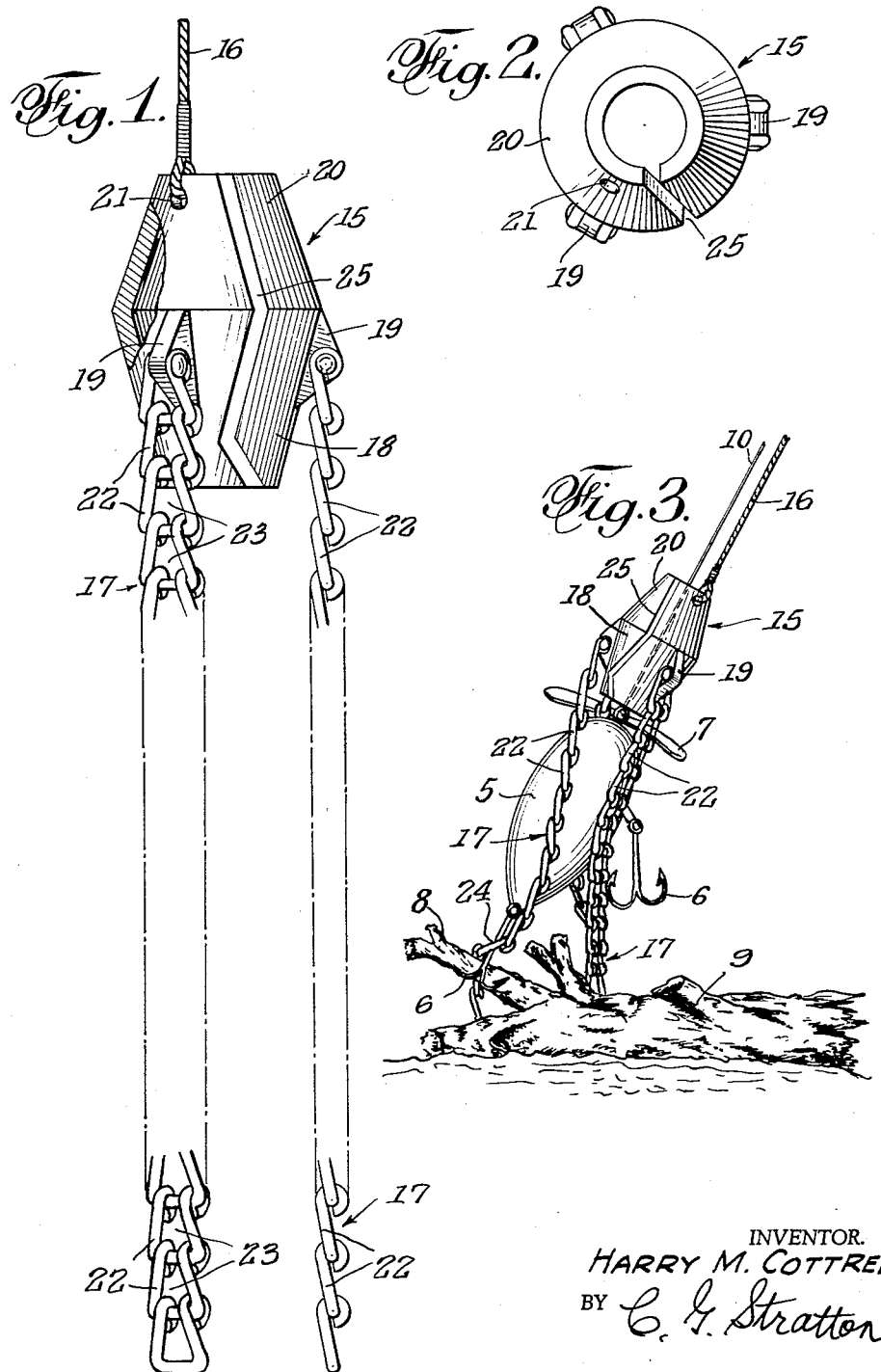

This invention relates to retrievers for fishing plugs and the like.

Whether with one or a plurality of hooks, fishing plugs are frequently lost due to said hooks snagging on tree and branch sections either on the bottom or extending upwardly from the bottom but below the water surface. Fish lines may not be strong enough not to tear during attempts to free such snagged hooks or to break them off if freeing them is not possible. Accordingly, in order to retrieve such fouled plugs which frequently are expensive items, an object of the present invention is to provide a plug retriever that is effective to exert such a pull on snarled plugs as to either free a snagged hook or break off such hook without placing tearing strain on the fish line.

Another object of the invention is to provide a plug retriever that may be applied to the fish line without cutting the latter and using said line to guide the retriever into position to operate effectively to free or break off a snagged hook of the plug.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

FIG. 1 is a side elevational view of a fishing plug retriever according to the present invention.

FIG. 2 is an end view thereof.

FIG. 3 is an elevational view, to a smaller scale, showing the retriever in operation.

Fishing plugs vary greatly in design. However, the same, essentially, comprise a body 5 that is provided with a plurality of fish hooks 6 and a propeller 7. The hooks are usually articulated and may have one, two, three or four barbs each, as desired. Underwater plugs sink to the bottom and are reeled in below the surface. Consequently, the fish hooks thereof may snag on bottom debris, such as logs, branches and rocks. Also, top water plugs are not free of becoming snagged, because, extending branches or other portions of submerged trees may snag one or more of the barbs or hooks of such plugs. FIG. 3 shows such a plug with one of its hooks 6 snagged on a branch 8 of a submerged log 9. It will be realized that unless the hook can be released or broken or the branch 8 snapped off by a pull on the light line 10 to which the plug is attached, the latter will be lost since it will be necessary to cut the line 10 so that another plug may be attached and fishing proceeded with.

The present plug retriever comprises, generally, a weighted sleeve 15, a separate and relatively strong line 16 on which said sleeve is hung, and a plurality of articulate members 17 connected to the outside of the sleeve and normally hanging pendant therefrom.

The sleeve 15 may be cast or molded of a suitable material of which metal is preferred to provide the same with sinkable weight. As shown, said sleeve is formed to have the shape of two base-to-base conical frustums. The lower frusto-conical portion 18 is provided with a set of ears 19, the same being symmetrically arranged. Three such ears are shown. The upper frusto-conical portion 20 has a hole 21 therethrough for the loop of the line 16. While one hole and one line are shown, two each may be provided to equalize the pull as well as providing the strength of two pull lines instead of one.

The articulate members 17 are connected at one end to the ears 19 and depend therefrom normally clear of the sleeve portion 18, as can be seen in FIG. 1. Said members 17 are formed as link chains of which the links 22 are of the square type affording openings 23 in the links. It will be clear that the members 17 may comprise any form of elongated and articulate depending devices in which barbs or hooks may become caught, as suggested at 24 of FIG. 3.

In practice, when the retriever is to be used, as to free the plug of FIG. 3, the sleeve 15 is placed around the fish line 10 by passing the latter through the slot 25 in said sleeve. The line is kept captive in the sleeve, because said slot is formed to have various and devious changes of direction, as indicated, that serve to intercept the fish line, but the latter may be readily threaded through the offset portions of the slot while still attached to the plug and to the reel or fish rod or pole.

After being strung on the fish line 10, the retriever is allowed to slide down on said line while the angler retains a hold on the line 16. When the sleeve 15 bottoms on the plug that is snagged, the line 16 may be used to raise and lower the sleeve, swing the same back and forth and cause the same to move in all directions all to the purpose of causing the elongated articulated members 17 to swing in various directions relative to each other and to the elements of the plug. During such movement, a caught condition as at 24 may result, or some other portion of the propeller or other hook may become thus caught. Also, the members 17 may snag onto the branch or twig that has snagged the plug. In any case, the line 16 may now be used to pull on the retriever and cause the latter to raise the plug or, at least, free the same from whatever has been snagging it. If it is necessary to break off a barb of the snagged hook, the relatively strong line 16 is capable of the necessary pull, whereas the line 10 would part under such a pull.

While the foregoing specification illustrates and describes what I now contemplate to be the best mode of carrying out my invention, the construction is, of course, subject to modification without departing from the spirit and scope of my invention. Therefore, I do not desire to restrict the invention to the particular form of construction illustrated and described, but desire to cover all modifications that may fall within the scope of the appended claim.

Having thus described my invention, what is claimed and desired to be secured by Letters Patent is:

A fishing plug retriever comprising a uniform-walled sleeve formed to have the shape of upper and lower conical frustums joined at their bases to provide said sleeve with a wide girth and oppositely tapered upper and lower ends, the full length of the sleeve having a fish line-admitting slot that has at least three slanted portions of which the middle portion slants oppositely from the slant of the two end portions to form the slot as a fish line retainer except when the line is bent to conform to the slant of the slot portions, a set of uniformly spaced ears integrally provided on the outside of the sleeve and extending radially outward from the lower conical frustum immediately adjacent to the girth of the sleeve, a link chain connected by one end to each ear, the chains dangling freely from said ears in spaced relation to the sleeve and adapted to swing in all directions as the sleeve is moved in various directions to catch onto a hook-provided plug on the end of a line extending through the sleeve, the upper conical frustum having a hole therein near the tapered end thereof, and a line, heavier than the fish line having a loop caught in said hole and suspending the sleeve and whereby the latter is moved, as mentioned, the ears extending beyond the outside of the sleeve girth to dispose the chains at least partly outward of said girth.

References Cited in the file of this patent

UNITED STATES PATENTS

| | | |
|---|---|---|
| 2,097,536 | Shirk | Nov. 2, 1937 |
| 2,482,037 | Swaim | Sept. 13, 1949 |
| 2,526,031 | Kocarek | Oct. 17, 1950 |
| 2,793,457 | Gaynes | May 28, 1957 |
| 2,809,460 | Taylor | Oct. 15, 1957 |